(12) United States Patent
Ishiharada et al.

(10) Patent No.: US 6,364,538 B1
(45) Date of Patent: Apr. 2, 2002

(54) REUSABLE FITMENT FOR USE IN AN OPTICAL FIBER

(75) Inventors: Minoru Ishiharada, Urawa; Shinichi Mizukubo, Yokohama, both of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/314,000

(22) Filed: May 19, 1999

(30) Foreign Application Priority Data

May 19, 1998 (JP) .............................. 10-136730

(51) Int. Cl.$^7$ ................................................ G02B 6/36
(52) U.S. Cl. .............................. 385/78; 385/58; 385/63; 385/69; 385/86
(58) Field of Search ............................ 385/123, 76, 77, 385/78, 84, 80, 70–73, 38, 134, 139, 147, 56–60, 74, 75, 140, 53–55, 63, 69, 86

(56) References Cited

U.S. PATENT DOCUMENTS

| 3,858,577 | A | * | 1/1975 | Bass et al. ..................... 128/8 |
| 4,398,796 | A | * | 8/1983 | Dalgoutte et al. ......... 350/96.2 |
| 4,406,515 | A | * | 9/1983 | Roberts .................... 350/96.21 |
| 5,737,471 | A | * | 4/1998 | Sugiyama et al. .......... 385/123 |
| 5,892,875 | A | * | 4/1999 | Ronn .......................... 385/115 |
| 6,067,396 | A | * | 5/2000 | Heitmann ................... 385/139 |

FOREIGN PATENT DOCUMENTS

JP          A-8-313739          11/1996

* cited by examiner

Primary Examiner—Frank G. Font
Assistant Examiner—Michael P. Mooney
(74) Attorney, Agent, or Firm—Sughrue Mion, PLLC

(57) ABSTRACT

A reusable fitment for connection to an optical fiber comprises a cylindrical main body, a translucent window member fixed to an inside of at least a top portion of the main body, and a connector detachably connected to a rear end portion of the main body.

5 Claims, 3 Drawing Sheets

REUSABLE FITMENT FOR USE IN AN OPTICAL FIBER

BACKGROUND OF THE INVENTION

1. Field of the Invention

This invention relates to a reusable fitment attached to an end portion of an optical fiber for connecting the optical fiber to a light source.

2. Description of Related Art

The optical fiber consists of a core made of a translucent material having a high refractive index and a clad made of a material having a refractive index lower than that of the core, and is used in various applications for optical transmission such as optical communication, illumination and the like.

In general, a solid material or liquid material is used as the core for the optical fiber. And also, a core having a large diameter of not less than 3 mm may be used for efficiently transmitting a greater quantity of a light. Furthermore, a bundle of many optical fibers each having a fine diameter of about 1 mm (bundle fiber) is frequently used.

In this case, it is preferable to use a solid core as the core for the optical fiber because of the handling easiness that the optical fiber can be cut into a required length at an installation location in use. Particularly, the use of a single core made of a plastic material is more favorable because it has a flexibility and facilitates the installation work.

In this type of the optical fiber, a light is directly entered from a light source through an end face of the solid core into an inside of the optical fiber and emitted from the other end face of the core after the propagation through the inside of the core. Since it is general to use the core by cutting into the required length, the cut end face of the core usually has microscopic irregularities, so that it tends to decrease an incident efficiency of the light. Even if the cut end face is rendered into a smooth face by polishing, since the polished end face is directly exposed to external environment, it is liable to adhere contaminants existing in the environment such as dusts and the like to the polished end face. When the light from the light source is directly irradiated to the end face of the core at a state of adhering the contaminants thereto, the incident efficiency of the irradiated light lowers and also a part of the light irradiated to the end face of the core is absorbed by the core to convert into heat and hence the end face of the core tends to generate heat.

And also, since a light source apparatus for the optical fiber i is high in the light energy at a light condensed portion to the optical fiber, if the end face of the optical fiber is directly disposed opposite to the light condensed portion, it is naturally rendered into a high temperature by heating, and consequently the core is apt to create thermal expansion, softening or thermal deterioration, and in the worst case, it is fear to bring about a fire by beginning to burn from the end face of the core.

Furthermore,.when the end face of the core is exposed to the external environment, there is a case that water in moisture existing in the external environment adheres to the end face of the core, which results in the occurrence of whitening phenomenon at the end face to bring about the lowering of light transmission efficiency.

For this end, there have been made various studies for solving the above problems, and a solution is disclosed, for example, in JP-A-8-313,739.

As shown in FIG. 4, an optical fiber 23 disclosed in the above publication consists of a core 21 and a clad 22, wherein a translucent window member 25 is fixed to at least an end face 24 of the core 21 at its light entrance side with an adhesive 26 and each end portion of the clad 22 is secured to respective end portion of the core 21 by placing a fitting member 27 on an outer peripheral surface of each end portion of the clad 22 and caulking it.

In such an optical fiber 23, the end face 24 at the light entrance side is shut off from the external environment through the translucent window member 25, so that the adhesion of contaminants, water and the like to the end face 24 can be prevented and hence the lowering of the light transmission efficiency and the heat generation at the end face 24 resulted from this adhesion can effectively be controlled.

However, the fitting member 27 is caulked from exterior at the light entrance-side end portion of the optical fiber 23, so that a spot input by caulking acts on the core 21 through the clad 22 to thereby cause such a deformation that strain is locally caused in the core 21 and hence it tends to lower the light transmission efficiency.

And also, since a caulked portion between the fitting member 27 and the end portion of the optical fiber 23 is located at a side approaching to the light source, it is easily subjected to heat energy from the light source to create a difference in thermal expansion between the fitting member 27 and the optical fiber 23 in the caulked portion, and hence it tends to easily come out the optical fiber 23 from the fitting member 27 at the caulked portion.

Furthermore, when the fitting member 27 is fitted onto the optical fiber 23, it is required to use a special caulking device, which is not preferable from a viewpoint of the operability. In addition, the fitting member 27 is used at a caulked state to the optical fiber 23, so that when the fitting member 27 is taken off from the optical fiber 23 and fitted onto another optical fiber, a considerable labor is taken. Moreover, since plastic deformation is caused in the caulked fitting member 27, the reuse of such a fitting member 27 is not favorable in case that it is necessary to surely connect the fitting member 27 to the optical fiber 23.

SUMMARY OF THE INVENTION

It is, therefore, an object of the invention to provide a reusable fitment wherein a translucent window member is fixed to an inside of a top of a main body of the fitment to shut off an end face of an optical fiber from external environment to thereby prevent heat generation and an occurrence of whitening phenomenon at the end face, and the connection between the optical fiber and the fitment is carried out by an adequate connecting means hardly producing strain in a core of the optical fiber, and a connecting portion is arranged at a position separated from the end face of the optical fiber being subjected to a high temperature by irradiation of a light, whereby optical transmission loss due to thermal deformation at the connected portion is decreased and the fitment can be attached to or detached from the optical fiber in a short time and the good connected state to the optical fiber can be maintained over a long time.

According to the invention, there is the provision of a reusable fitment comprising a cylindrical main body having an inner diameter substantially equal to an outer diameter of an optical fiber, a translucent window member fixed to an inside of at least a top portion of the main body, and a connector detachably connected to a rear end portion of the main body for fixing and holding the optical fiber.

In case of requiring that an incident light is perfectly reflected at an outer peripheral surface of the translucent window member to more efficiently transmit to the optical fiber, it is favorable to cover the outer peripheral surface of the translucent window member with a coating layer having a refractive index lower than that of the window member.

Furthermore, it is favorable that the translucent window member is fixed to the main body of the fitment by fitting the window member into the top portion of the main body and caulking the main body from an outer surface thereof, or by using an adhesive, or by utilizing both means.

Moreover, it is favorable that the optical fiber is a single-core type optical fiber having a large diameter.

BRIEF DESCRIPTION OF THE DRAWINGS

The invention will be described with reference to the accompanying drawings, wherein.

DESCRIPTION OF PREFERRED EMBODIMENTS

Figure 1:
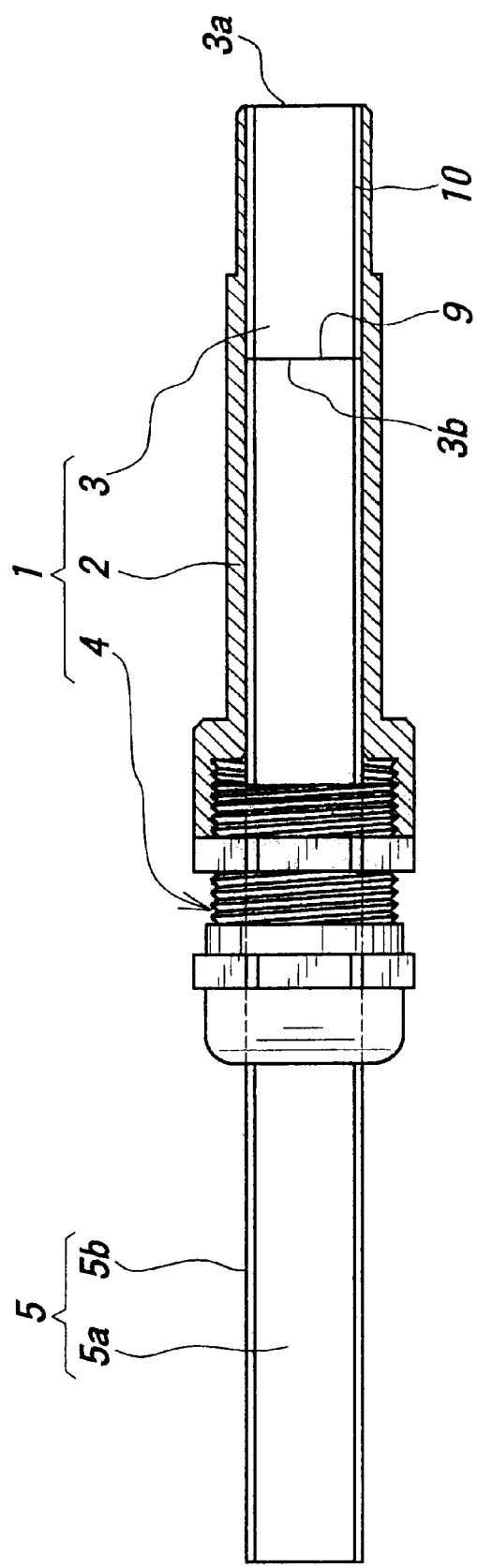
FIG. 1 is a diagrammatically plan view partly shown in section of an embodiment of the reusable fitment according to the invention illustrating a state of connecting the fitment to an optical fiber.

In FIG. 1 is diagrammatically shown a state of connecting a reusable fitment according to the invention to an end portion of an optical fiber, in which numeral 1 is a reusable fitment, numeral 2 a cylindrical main body of the fitment, numeral 3 a translucent window member, and numeral 4 a connector.

That is, the reusable fitment 1 shown in FIG. 1 comprises the main body 2, the translucent window member 3 fixed to an inside of a top portion of the main body, and a connector 4 connected and fixed to an rear end portion of the main body 2.

Figure 2:
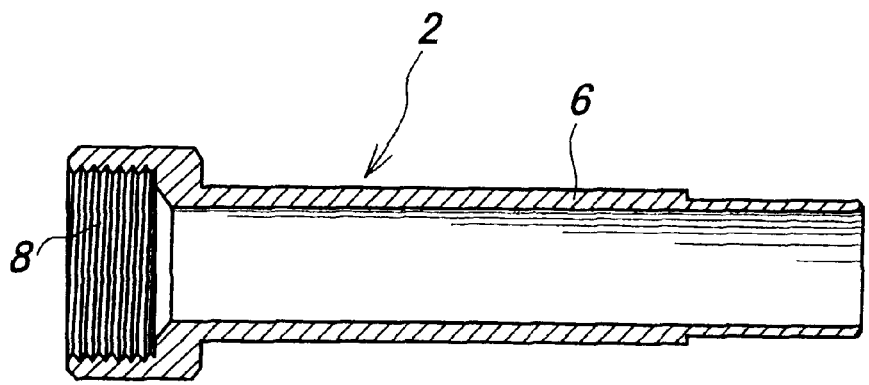
FIG. 2 is a diagrammatically section view of a cylindrical main body in the fitment according to the invention.

As shown in FIG. 2, the main body 2 is a cylindrical portion having an inner diameter substantially equal to an outer diameter of an optical fiber 5 consisting of a core 5a made of a translucent material having a high refractive index and a clad 5b made of a material having a refractive index lower than that of the core 5a. In an inner peripheral surface of the rear end portion of the main body 2 is formed a female screw portion 8 corresponding to a first male screw portion 7 of the connector 4.

The term "the inner diameter of the cylindrical portion 6 substantially equal to the outer diameter of the optical fiber 5" used herein concretely means that the outer diameter $D_f$ of the optical fiber 5 and the inner diameter $D_i$ of the cylindrical portion 6 satisfy a relationship of $1.00 D_f < D_i < 1.05 D_f$.

When the inner diameter $D_i$ of the cylindrical portion 6 is not more than $1.00 D_f$, the optical fiber 5 can not be inserted into the cylindrical portion 6, while when it is not less than $1.05 D_f$, the center of the core 5a is shifted from the center of the translucent window member 3 to cause loss of light transmission.

The main body 2 can be made of various materials such as plastics and metals. Particularly, it is favorable to be made of aluminum, copper, or brass having excellent heat resistance and heat conduction (heat dissipation).

In the translucent window member 3, it is favorable to use a translucent material, which includes inorganic glasses such as quartz glass, pyrex, multi-component glass, sapphire, rock crystal and the like; organic glasses and plastics such as polyethylene, polypropylene, ABS resin, acrylonitrile-styrene copolymer resin, styrene-butadiene copolymer, acrylonitrile-EPDM-styrene copolymer, styrene-methylmethacrylate copolymer, (metha-) acrylic resin, epoxy resin, polymethylpentene, allyl diglycol carbonate resin, spiran resin, amorphous polyolefin, polycarbonate, polyamide, polyarylate, polysulfone, polyallylsulfone, polyether sulfone, polyether imide, polyimide, polyethylene terephthalate, diallyl phthalate, fluorine resin, polyester carbonate, silicone resin and the like.

In particular, the inorganic glass such as quartz glass, pyrex, multi-component glass or the like is excellent in not only the translucency but also the heat resistance and is chemically stable, so that it is more favorable to be used as the translucent window member 3.

In order to control Fresnel reflection resulting in the lowering of the light transmission efficiency in the optical fiber 5 at an interface between the translucent window member 3 and the core 5a, it is favorable to use a material having a refractive index equal to or at least close to that of the core 5a as the translucent window member 3.

In addition, it is desirable that the translucent window member 3 is closed to the end face of the core 5 in the optical fiber 5 so as not to form an air layer between the window member 3 and the end face in order to increase the incident efficiency of light from the translucent window member 3 to the core 5a.

For this purpose, an adhesive may be used. In case of requiring the removal of the optical fiber 5 from the fitment 1, it is favorable to insert, for example, an oil, a grease or the like between the end face of the core 5a and the translucent window member 3.

In order to effectively achieve an object of the invention, the translucent window member 3 is preferable to have a length of 0.1–10.0 cm, preferably 0.5–5.0 cm. Particularly, the length is favorable to be 1.0–3.0 cm in view of economical points.

When the length of the translucent window member 3 is less than 0.1 cm, heat of the translucent window member 3 heated by heat energy from a light source can not sufficiently be shut off and hence such a heat is transmitted to an end face 9 of the optical fiber 5, whereby the core 5a is apt to create the thermal deterioration and the like, while when it exceeds 10 cm, not only the increase of the cost is caused, but also the transmittancy of the translucent window member itself tends to lower in accordance with the material of the window member.

Moreover, in order to prevent the lowering of the incident efficiency of the light, it is favorable to finish both end faces 3a and 3b of the translucent window member 3 to smooth surfaces. In case of requiring the more prevention of lowering the incident efficiency of the light, it is preferable to form an antireflective film on the end face 3a.

And also, it is desirable that a coating layer 10 made of a material having a refractive index lower than that of the window member is formed on an outer peripheral surface of the translucent window member 3. Especially, when the length of the translucent window member 3 is long, it is favorable to form the coating layer 10 in order to perfectly reflect the light at the outer peripheral surface to efficiently transfer the light to the optical fiber 5.

As the coating layer 10, use may be made of plastics, rubber and glass.

Among them, it is favorable to use silicone polymer and fluorine polymer having a low refractive index and an excellent heat resistance and being hardly degraded by a light from the light source. As the coating layer 10, it is more favorable to use a silicone polymer such as polydimethyl siloxane polymer, polymethylphenyl siloxane polymer, fluorosilicone polymer or the like; polytetrafluoroethylene (PTFE), tetrafluoroethylene-hexafluoropropylene copolymer (FEP), tetrafluoroethylene-perfluoroalkoxyethylene copolymer (PFE), polychlorotrifluoroethylene (PCTFE), tetrafluoroethylene-ethylene copolymer (ETFE), polyvinylidene fluoride, polyvinyl fluoride, vinylidene fluoride-trifluorochloroethylene copolymer, vinylidene fluoride-hexafluoropropylene copolymer, vinylidene fluoride-hexafluoropropylene-tetrafluoroethylene terpolymer, tetrafluoroethylene propylene rubber, fluorine thermoplastic elastomer or the like.

As a method of forming the coating layer 10 on the outer peripheral surface of the translucent window member 3, there are a painting, a coating, a method winding a tape made from the above material and a method inserting the translucent window member 3 into a tube, but it is not limited to these methods. For example, when a heat-shrinkable tube is used as the tube, the coating layer 10 may be formed by inserting the translucent window member 3 into the heat-shrinkable tube and then shrinking the tube under heating onto the outer peripheral surface of the window member.

And also, the coating layer 10 is preferable to be made of a translucent material. In this case, the coating layer 10 can be formed on the outer peripheral surface of the translucent window member 3 as a reflective film made of a metal material or the like by using a surface treating technique such as plating, vapor deposition, sputtering or the like.

As a method of fixing the translucent window member 3 to the inside of the top portion of the cylindrical main body 2, it is favorable to fit the translucent window member 3 into the top portion of the main body 2 and caulk the outer surface of the main body 2. As the other fixing means, adhesion, a set screw or the like may be used. In any case, these fixing methods can be used alone or in combination.

When the translucent window member 3 is fixed to the main body 2 with an adhesive, it is favorable to use various transparent adhesives such as acrylic resin, epoxy resin, phenolic resin, cyanoacrylic resin, silicone rubber, chloroprene rubber, fluorine rubber and the like as the adhesive. Among them, silicone rubber or fluorine rubber having an excellent heat resistance, hardly causing optical deterioration and being low in the refractive index is more preferable.

When the translucent window member 3 is fixed by the caulking of the main body 2, if the coating layer of plastic or rubber is formed on the outer peripheral surface of the translucent window member 3, the caulking may be carried out after the insertion of the translucent window member 3 into the main body 2, while if the coating layer 10 is made of a material other than the plastic or rubber, or if the coating layer 10 is not formed, the caulking may be carried out after a middle layer such as a tape, a tube or the like made of plastic or rubber is interposed between an inner peripheral surface of the main body 2 and an outer peripheral surface of the translucent window member 3. As the middle layer, it is favorable to use fluorine or silicone material being hardly degraded by heat or light.

Moreover, in the case of fixing the translucent window member 3 by caulking of the main body 2, the caulking ratio is preferably within a range of 10–90%, more particularly 20–60%. When the caulking ratio is less than 10%, the window member is not sufficiently fixed and there is a fear of coming out the window member from the main body, while when it exceeds 90%, there is feared the breakage of the window member and also the optical loss of the core tends to become large.

As the caulking method, there may be mentioned various methods such as ring-shaped three-stage caulking, four-stage caulking and the like, which are not particularly limited.

In the case of fixing the translucent window member 3 by the caulking of the main body 2, the good fixed state of the translucent window member 3 to the main body 2 can stably be maintained over a long time because it is not required to use a material being easily degraded by heat or light such as an adhesive or the like.

The caulking ratio is determined from an experimental equation shown below.

Caulking ratio (%)=$[1-(D_2-D_1-2t_a)/2t_i]\times 100$ wherein $t_a$ is a thickness of the main body, $t_i$ is a thickness of the middle layer or the coating layer, $D_1$ is an outer diameter of the core, and $D_2$ is a diameter of a channel after caulking.

Figure 3:
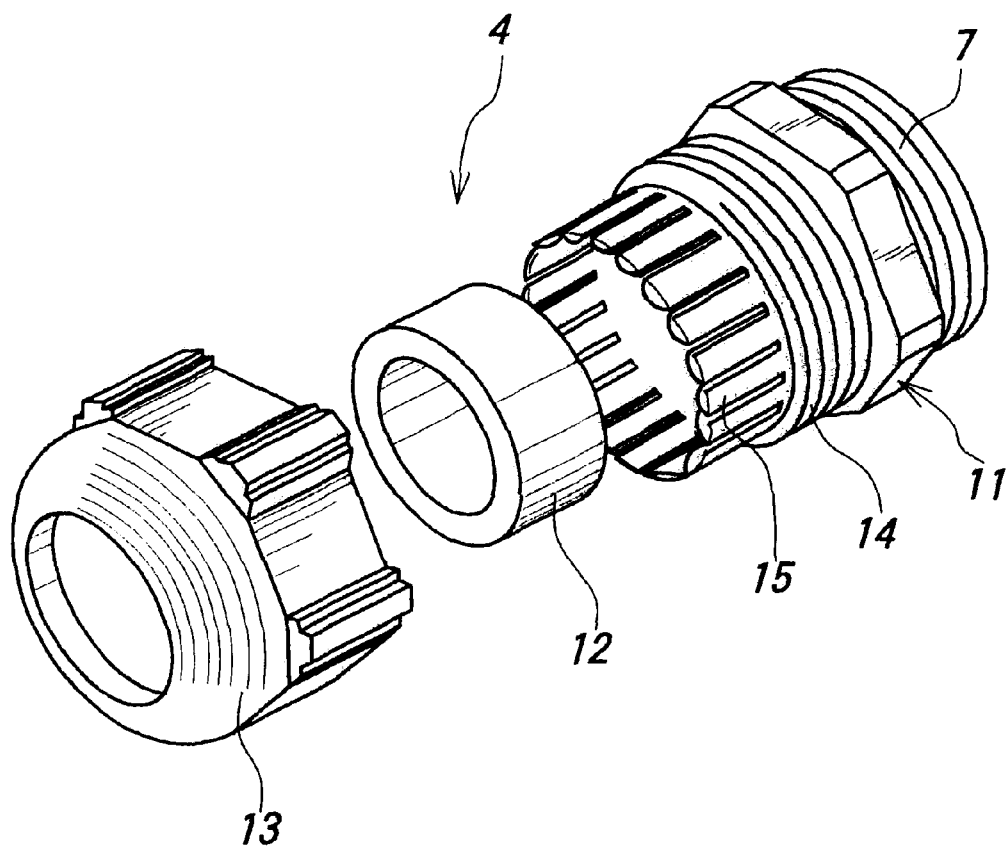
FIG. 3 is an exploded perspective view of a connector in the fitment according to the invention.

As shown in FIG. 3, the connector 4 is comprised of a connecting member 11, a packing 12, and a clamping nut 13.

The connecting member 11 is provided at its one end with a first male screw portion 7 screwing with the female screw portion 8 formed on the inner peripheral surface of the main body 2 and at the other end with a second male screw portion 14 for fastening the clamping nut 13.

The connecting member 11 is fixedly connected to the rear end portion of the main body 2 by screwing the first male screw thread portion 7 into the female screw portion 8 of the main body 2 through a rubber packing (not shown).

In case of fitting the fitment 1 to the optical fiber 5, after the packing 12 is inserted into the inside of the second male screw portion 14 in the connecting member 11, the clamping nut 13 is clamped to the second male screw portion 14 to elastically deform the packing 12 in a direction of decreasing the diameter of the packing 12, and hence the clamping force of the clamping nut 13 acts onto the outer peripheral surface of the optical fiber 5 through the packing 12 as a uniform surface pressure, whereby the fitment 1 can easily and surely be connected to the optical fiber 5.

As mentioned above, according to the invention, the connection of the fitment 1 to the optical fiber 5 is conducted by uniformly clamping the outer peripheral surface of the optical fiber 5 through the packing 12, so that strain is hardly applied to the core 5a. Especially, the connected portion of the fitment 1 is located at a position separated apart from the end face of the optical fiber 5, so that the thermal deformation of the optical fiber and loss of light accompanied therewith hardly occur and the sure fixation can be obtained.

In the optical fiber 5 connected with the fitment 1, a light from a light source is irradiated to the translucent window member 3 and entered into the core 5a therethrough, so that the core 5a is not directly heated by the irradiation of the light and also the heat generation based on the absorption of light produced when the incident light is directly irradiated to the end face of the core 5a adhered with dusts and the like is prevented, whereby thermal expansion or thermal deterioration of the core can effectively be prevented. Particularly, it can effectively be prevented that the end face of the core 5a is rendered into a high temperature by irradiating the light having a high energy to bring about the fire by the combustion of the core.

In addition, when the translucent window member 3 is made of an infrared ray-absorbable material or an infrared ray-reflecting layer is arranged at an entrance-side end face of the window member, an excellent heat resistance can be developed together with the above effect.

Since the end face of the core 5a is shut off from external environment through the window member 3, there is no adhesion of contaminant such as dust or the like and moisture onto the end face of the core 5a, so that the loss of light transmission becomes less.

And also, when the window member 3 is made of a material having a property of absorbing or reflecting an ultraviolet ray, there is no direct irradiation of the ultraviolet ray to the end face of the core 5a, so that the deterioration of the core by the irradiation of the ultraviolet ray can be prevented.

Especially, the aforementioned action and effect are effectively developed when using the inorganic glass as the window member 3, so that the fitment 1 according to the invention is suitable for use in an optical fiber wherein a core is made of a flexible plastic material being relatively weak to heat and high in the thermal expansion coefficient and easily causing the deterioration by heat or the like.

In the invention, when the translucent window member 3 is previously fixed to the main body 2, the optical fiber is cut into a given length in a site for the arrangement of the optical fiber and a top of the optical fiber is inserted into the main body of the fitment so as to contact with the translucent window member 3 and thereafter the fitment can simply be connected to the optical fiber by using the connector 4 for a short time without using a special device such as caulking device or the like, so that the connection operability can be improved.

On the other hand, in the case of taking off the optical fiber from the fitment, the packing 12 is elastically returned to the original state by loosening the clamping nut 13 in the connector 4, whereby the optical fiber can easily be taken out from the fitment and also the fitment 1 can be reused.

Moreover, as shown in FIG. 3, plural slits 15 for increasing a diameter reducing ratio are disposed on the top of the second male screw portion 14 housing the packing 12 therein in order to sufficiently apply the clamping force of the clamping nut 13 to the packing 12. Such a construction may properly be adopted, if necessary.

Although the above is described with respect to only a preferred embodiment of the invention, various modifications may be taken within a scope of the invention.

For example, when the single-core type optical fiber having a large outer diameter and formed by filling a solid core having a refractive index larger than that of a clad in an inside of a tubular clad is used as the optical fiber, it is favorable to effectively enhance the efficiency of the optical connection to the window member. However, the invention is not limited to the above optical fiber and is applicable to an optical plastic fiber, an optical glass fiber, a bundle fiber (optical fiber cable) formed by bundling fine optical fibers and the like.

The following examples are given in illustration of the invention and are not intended as limitations thereof.

EXAMPLE 1

After a window member 3 of a columnar pyrex having a diameter of 13 mm and a length of 2 cm coated on its outer peripheral surface with a heat-shrinkable FEP tube having a thickness of 0.3 mm is inserted into a main body 2 of a fitment made of aluminum shown in FIG. 2, it is caulked from the outside at a caulking ratio of 50% by using a three-stage ring dies. In the caulked portion of the main body 2, an outer diameter is 16 mm and an inner diameter is 14.1 mm. Next, a connector 4 for fixing an optical fiber (connector "MS16", made by SKINTOP Corporation) is screwed to a rear end portion of the main body 2. Into the thus prepared fitment 1 is inserted an optical fiber 5 formed by using FEP tube as a clad 5b and an acrylic copolymer as a core 5a (outer diameter: 14 mm, core diameter: 12.8 mm, refractive index of core: 1.48) so as to contact with the window member 3 and clamped by a clamping nut 13 in the connector 4. This state is substantially the same as shown in FIG. 1. In this case, the working time for fixing the fitment 1 to the optical fiber 5 is about 1 minute.

EXAMPLE 2

The same procedure as in Example 1 is repeated except that a grease (OPTSEAL, trade name, made by Shin-Etsu Silicon Co., Ltd., refractive index: 1.47) is applied to an end face 9 of the optical fiber 5 prior to the contact of the optical fiber 5 with the window member 3. In this case, the working time for fixing the fitment 1 to the optical fiber 5 is about 1.5 minutes.

Comparative Example

Figure 4:
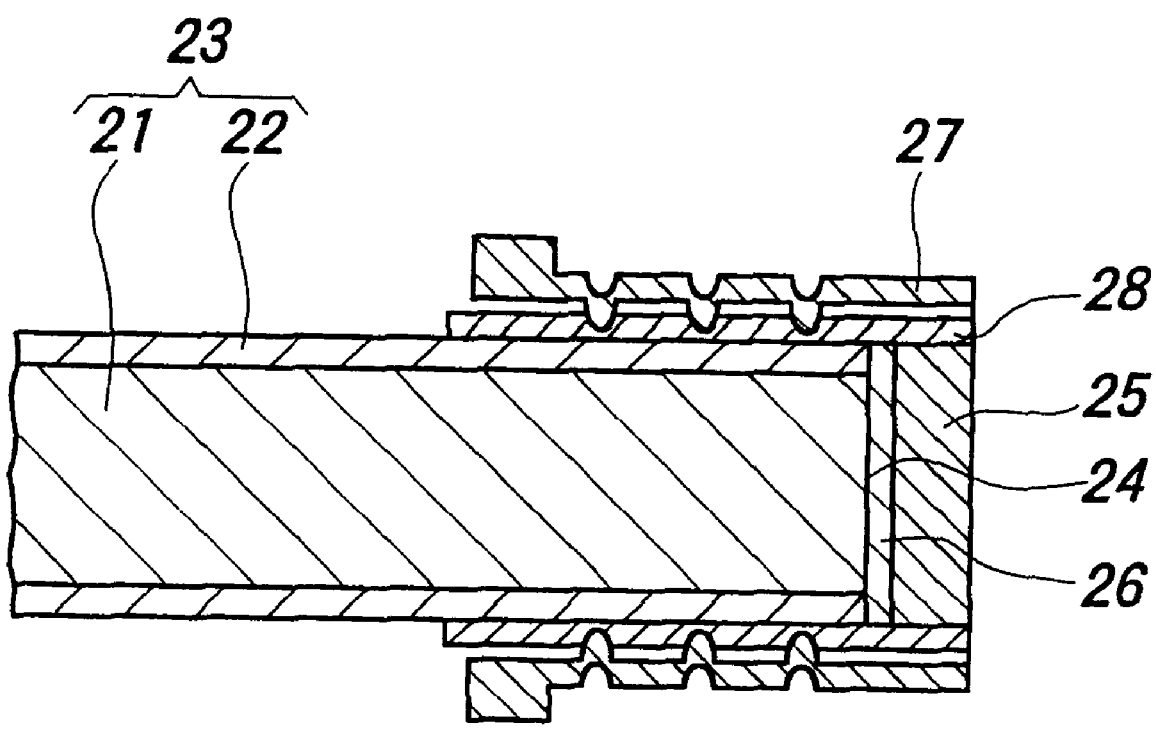
FIG. 4 is a section view of the conventional fitting member illustrating a state of connecting the fitting member to an optical fiber.

A translucent window member 25 of a disk-shaped pyrex (diameter: 13.5 mm, length: 0.5 cm, refractive index: 1.475) is adhered to an optical fiber 23 formed by using FEP tube as a clad 22 and an acrylic copolymer as a core 21 (outer diameter: 14 mm, core diameter: 12.8 mm, refractive index of core: 1.48) with an ultraviolet-curing type acrylic adhesive 26 (Photobond 300, trade name, made by Myojo Charchil Corp.). Moreover, outer peripheral surfaces of both end portions of the clad 22 and an outer peripheral surface of the window member 25 are covered with a heat-shrinkable FEP tube 28 having a thickness of 0.3 mm (refractive index: 1.335) and thereafter a fitting member 27 made of stainless steel is mounted and caulked from the outside at a caulking ratio of about 40% by using a three-stage ring-shaped caulking dies. This state is substantially the same as shown in FIG. 4. In this case the working time for fixing the fitting member 27 to the optical fiber 23 is required to be about 30 minutes, which is more than 20 times the working time in Examples 1 and 2.

[Test Method]

The fitment fixed to the optical fiber (length: 2 m) is connected to a light source for the optical fiber using a metal halide lump of 150 W (Model A200, made by Bridgestone Corporation) and then the quantity of light transmission (lux) and a temperature of an outer peripheral surface of that portion of the fitment which is located inward from the top of the fitment by 20 mm after the irradiation for 1 hour are measured. The measured results are shown in Table 1.

TABLE 1

|  | Quantity of light transmission (lux) | Temperature of fitment (° C.) |
| --- | --- | --- |
| Comparative Example | 3200 | 51 |
| Example 1 | 3700 | 43 |
| Example 2 | 4100 | 40 |

As seen from the results of Table 1, in Examples 1 and 2, the quantity of light transmission is large and the temperature is low as compared with those of the comparative example. In Example 2 applying the given grease to the end face of the optical fiber, the quantity of light transmission increases and the temperature at the outer peripheral surface of the fitment lowers as compared with Example 1 using no grease.

Next, the heat cycle test (cycle of −30° C.×1 hr and 80° C.×1 hr) is continuously carried out for seven days and thereafter a pulling force when the optical fiber is pulled out from the fitment is measured.

As a result, the optical fiber cannot be pulled out from the fitment even at a pulling force of about 30 kg in Examples 1 and 2, while the optical fiber is easily pulled out from the fitment at a pulling force of about 10 kg in the comparative example.

According to this invention, it is possible to provide a reusable fitment capable of attaching or detaching to an optical fiber in a short time and maintaining a good connected state to the optical fiber over a long time without hardly creating a loss of light transmission accompanied with the connection to the optical fiber.

What is claimed is:

1. A reusable fitment comprising a cylindrical main body having an inner diameter substantially equal to an outer diameter of an optical fiber, a translucent window member fixed to an inside of at least a top portion of the main body, and a connector detachably connected to a rear end portion of the main body for fixing and holding the optical fiber.

2. A reusable fitment according to claim 1, wherein an outer peripheral surface of the translucent window member is covered with a coating layer having a refractive index lower than that of the window member.

3. A reusable fitment according to claim 1, wherein the translucent window member is fixed to the main body of the fitment by fitting the window member into the top portion of the main body and caulking the main body from an outer surface thereof.

4. A reusable fitment according to claim 1, wherein the translucent window member is fixed to the main body of the fitment by using an adhesive.

5. A reusable fitment according to claim 1, wherein the optical fiber is a single-core type optical fiber having a large diameter.

* * * * *